(12) United States Patent
Park et al.

(10) Patent No.: US 7,607,316 B2
(45) Date of Patent: Oct. 27, 2009

(54) AIR CONDITIONER FOR VEHICLE

(75) Inventors: Yuncheol Park, Daejeon-si (KR);
Yongeun Seo, Daejeon-si (KR);
Sangchul Byon, Daejeon-si (KR);
Sungho Kang, Daejeon-si (KR);
Yongsang Kim, Daejeon-si (KR)

(73) Assignee: Halla Climate Control Corporation, Daejeon-si (KR)

(*) Notice: Subject to any disclaimer, the term of this patent is extended or adjusted under 35 U.S.C. 154(b) by 484 days.

(21) Appl. No.: 11/705,625

(22) Filed: Feb. 13, 2007

(65) Prior Publication Data

US 2007/0197155 A1    Aug. 23, 2007

(30) Foreign Application Priority Data

Feb. 17, 2006 (KR) ............. 10-2006-0015684
Feb. 9, 2007   (KR) ............. 10-2007-0013523

(51) Int. Cl.
*F25D 19/00* (2006.01)

(52) U.S. Cl. ......................... 62/298; 403/349

(58) Field of Classification Search ............ 62/298; 403/348–353
See application file for complete search history.

(56) References Cited

U.S. PATENT DOCUMENTS

| 4,830,515 | A  | * | 5/1989  | Cortes ............... 374/208 |
| 5,342,126 | A  | * | 8/1994  | Heston et al. ....... 374/208 |
| 6,217,248 | B1 | * | 4/2001  | Reiff .................. 403/24 |
| 6,299,661 | B1 | * | 10/2001 | Bloomer ............. 55/385.3 |
| 6,978,754 | B2 | * | 12/2005 | Cicone ............. 123/184.21 |
| 7,290,683 | B2 | * | 11/2007 | Gerenraich ........... 222/180 |

FOREIGN PATENT DOCUMENTS

| KR | 10-2004-0103595 A | 12/2004 |
| KR | 10-2004-0108581 A | 12/2004 |

* cited by examiner

*Primary Examiner*—William E Tapolcai
(74) *Attorney, Agent, or Firm*—Fulbright & Jaworski L.L.P.

(57) ABSTRACT

The present invention relates to an air conditioner for a vehicle that is capable of easily and simply assembling a thermistor-holding device insertedly with a coupling hole formed at one side surface of a lower case of an air conditioning case, while inserting first and second protrusions formed through upper and lower molds around the coupling hole thereto, such that the total number of parts and the working period are all reduced to improve the productivity of the product and the repairing or exchanging work of the thermistor is carried out easily.

11 Claims, 8 Drawing Sheets

FIG. 1

Prior Art

FIG. 2

Prior Art

FIG. 3

Prior Art

FIG. 4

Prior Art

AIR CONDITIONER FOR VEHICLE

This application claims priority from Korean Patent Application No. 10-2006-0015684 filed Feb. 17, 2006, and Korean Patent Application No. 10-2007-0013523 filed Feb. 9, 2007, each of which are incorporated herein by reference in their entireties.

BACKGROUND OF THE INVENTION

1. Field of the Invention

The present invention relates to an air conditioner for a vehicle, and more particularly, to an air conditioner for a vehicle that is capable of easily and simply assembling a thermistor-holding device insertedly with a coupling hole formed at one side surface of a lower case of an air conditioning case, while inserting first and second protrusions formed through upper and lower molds around the coupling hole thereto, such that the total number of parts and the working period are all reduced to improve the productivity of the product and the repairing or exchanging work of the thermistor is carried out easily.

2. Background of the Related Art

In general, an air conditioning system of the air conditioner for a vehicle includes a compressor, a condenser, a receiver drier, an expansion valve, and an evaporator that are sequentially connected by a refrigerant pipe, such that as the compressor is activated by the power of an engine, refrigerant is circulated therein.

In such the air conditioning system, the refrigerant gas compressed to high temperature and pressure in the compressor is heat-exchanged with the ambient air surrounding the condenser, while being passed through the condenser, such that the refrigerant gas is changed into a liquid state. The liquefied refrigerant is decontaminated when passed through the receiver driver, and the decontaminated refrigerant is changed with low temperature gas after passing through the expansion valve. The low temperature gaseous refrigerant is heat-exchanged and cooled with the ambient air surrounding the evaporator while passing through the evaporator, and the cool air is discharged through a blower to the inside of the vehicle. Next, the low temperature gaseous refrigerant that is generated through the evaporator is transferred back to the compressor wherein the cycling of the refrigerant is repeated.

Under the above cycling process of the refrigerant, condensed water may be frozen by the difference between an evaporation temperature and an outside temperature, and in this case, the freezing is especially generated on the surface of the evaporator, which makes the heat-exchanging efficiency of the evaporator greatly deteriorated.

Thus, a thermistor as a temperature sensor is mounted at the front of the evaporator or inside the evaporator core, for sensing the temperature of cool air emitted from the evaporator, and if the sensed temperature falls to 0° C. below, the compressor stops so as not to work the air conditioning system. To the contrary, if the sensed temperature rises to 4° C. above, the compressor is activated again so as to work the air conditioning system, thereby preventing the evaporator from being frozen.

The thermistor is mounted by means of two types: one being mounted between tubes in such a manner as to be fixedly fit to radiant fins of the evaporator; and the other being mounted spaced apart from the evaporator by a predetermined distance.

Figure 1:
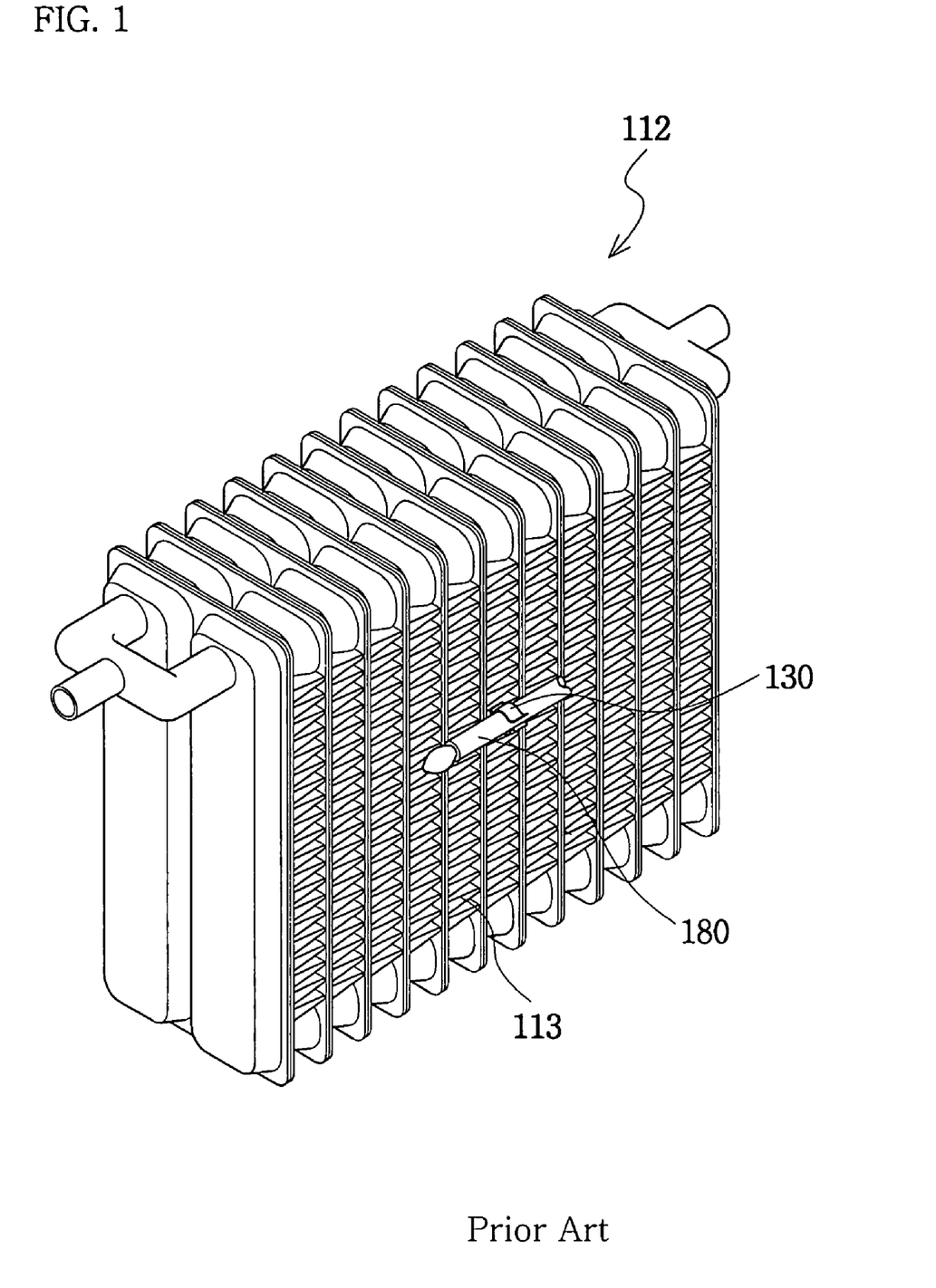
FIG. 1 is a perspective view showing a thermistor mounted at an evaporator by means of a thermistor-holding device according to a conventional air conditioner.
Figure 2:
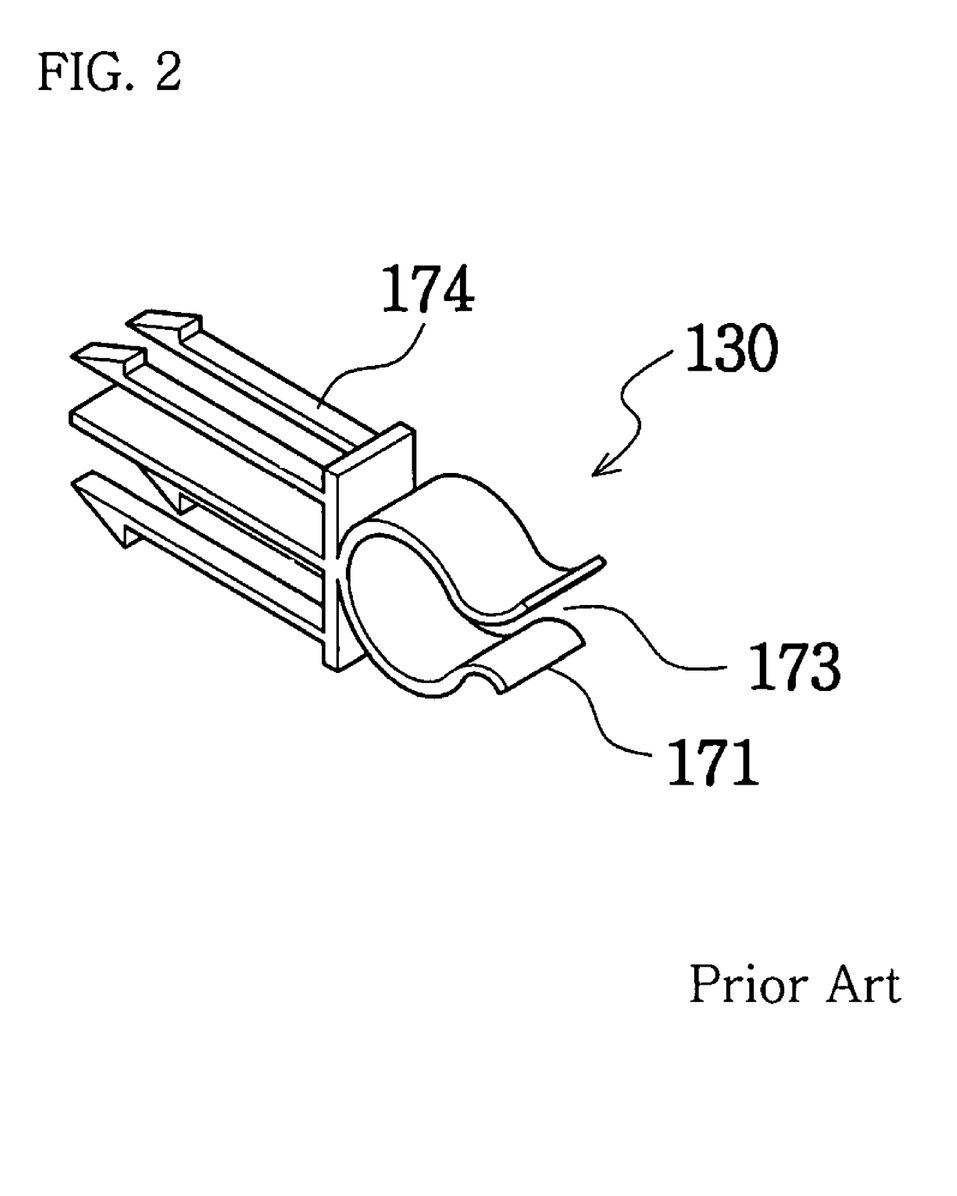
FIG. 2 is a perspective view showing the thermistor-holding device of FIG. 1.

As shown in FIGS. 1 and 2, a thermistor 180 is mounted by means of a thermistor-holding device 130 that is inserted between the radiant fins 113 of the evaporator 112. The thermistor-holding device 130 includes a loop-like locking part 171 formed at one end portion thereof, an insertion portion 173 formed at one side of the locking part 171 for inserting the thermistor 180 thereinto, and a plurality of hooks 174 formed extended long in a horizontal direction at the lower portion of the locking part 171 in such a manner as to be inserted between the radiant fins 113.

However, in the case where the thermistor 180 is mounted at the front of the evaporator 112 by using the thermistor-holding device 130, the plurality of hooks 174 of the thermistor-holding device 130 is inserted between the radiant fins 113 of the evaporator 112, such that if the insertion is carried out carelessly, the radiant fins 113 may be damaged or permanently deformed. Further, as the hooks 174 become weak at their supporting forces against the radiant fins 113 after the insertion into the radiant fins 113, the thermistor-holding device 130 may be moved undesirably by the wind pressure of air passing through the evaporator 112.

As a result, the thermistor-holding device 130 may be moved from its original position inserted into the radiant fins 113 or even escaped from the radiant fins 113, such that the thermistor 180 does not sense the cooling air temperature on the surface of the evaporator 112, thereby decreasing the performances of the air conditioning system and causing the generation of defective products.

Moreover, a wire 181 connected to the end portion of the thermistor 180 traverses the evaporator 112 in such a manner as to be loosely connected to the outside terminal of the air conditioning case 110, such that the wire 181 keeps the air being sent to the evaporator 112 from gently flowing. More particularly, in a case where the thermistor 180 is repaired or exchanged when it is out of order, the air conditioning case 110 is first disassembled before the thermistor 180 is separated from the evaporator 112, thereby making it difficult to carry out the repairing or exchanging work.

Figure 3:
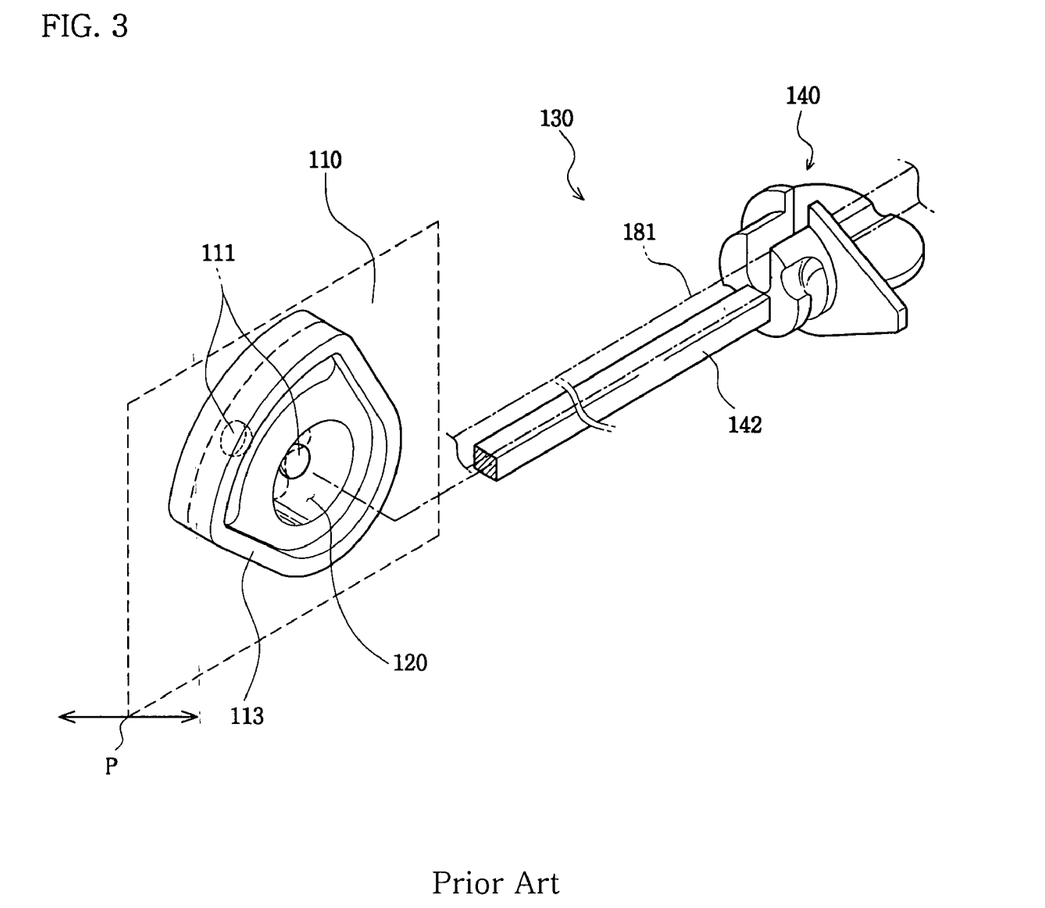
FIG. 3 is a perspective view showing a thermistor-holding device assembled with a coupling hole formed at one side surface of an air conditioning case according to another type of conventional air conditioner.
Figure 4:
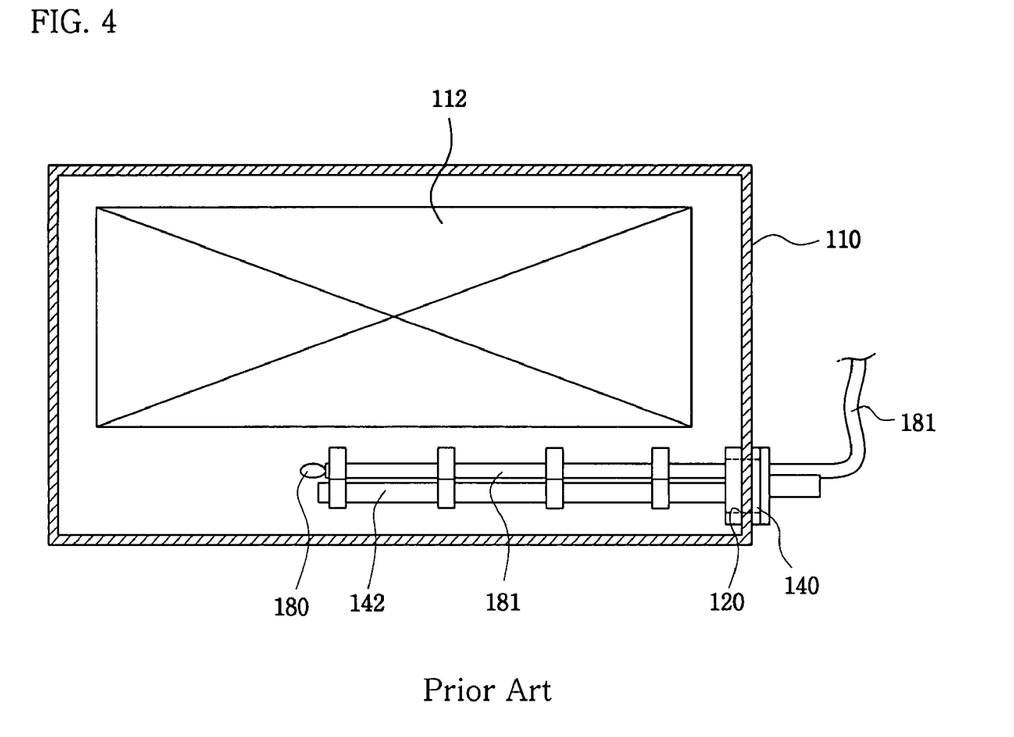
FIG. 4 is a plane sectional view showing the thermistor-holding device mounted at the air conditioning case in FIG. 3.

To solve the above-mentioned problems, there is disclosed in Korean Patent Publication No. 2004-0108581 filed by the applicant of the present invention. Referring to FIGS. 3 and 4 showing the another type of prior art, a thermistor-holding device 130 of an evaporator in an air conditioning case 110 includes: a coupling hole 120 formed on one side surface of an air conditioning case 110 divided into a pair of cases and having protrusions 111 formed along the inner periphery thereof; a protruded part 113 mounted at the outer surface of the air conditioning case 110 in such a manner as to be placed around the coupling hole 120; an assembling part 140 inserted along the inner periphery of the protruded part 113 in such a manner as to be coupled to the coupling hole 120; and a support part 142 coupled to the assembling part 140 in such a manner as to be inserted through the coupling hole 120 and disposed in a horizontal direction near the evaporator 112 mounted inside of the air conditioning case 110, for supporting the wire 181 connected at the end thereof with the thermistor 180.

After the thermistor-holding device 130 is fixedly mounted through the coupling hole 120 of the air conditioning case 110, the wire 181 is supported by means of the support part 142 coupled on the thermistor-holding device 130, such that the wire 181 and the thermistor 180 connected to the wire 181 are not moved or escaped from their original positions, thereby allowing the cooling temperature on the surface of the evaporator 112 to be accurately sensed. Also, in the case where the thermistor 180 needs to be repaired or exchanged when it is out of order, the thermistor 180 can be easily repaired or exchanged through the coupling hole 120 of the air conditioning case 110.

As the thermistor-holding device 130 has a relatively complicated structure, however, there occurs a problem that the number of parts and the working period are increased.

On the other hand, the structure wherein the protrusions 111 are formed on the inner periphery of the coupling hole 120 of the air conditioning case 110 and the thermistor 180 is assembled through the coupling hole 120 is applied to the air conditioning case 110 that is divided into left and right cases. Upon injection-molding for the air conditioning case 110, a parting line P of a mold is formed at a highest point of each protrusion 111 so as to form the protrusions 111 on the inner periphery of the coupling hole 120 of the air conditioning case 110, and the mold is separated left and right, such that the protrusions 111 are formed on the inner periphery of the coupling hole 120.

However, in the structure wherein the thermistor 180 is mounted through the coupling hole 120 formed on one side surface of a lower case in the air conditioning case 110 that are divided into an upper left case, an upper right case, and the lower case, the parting line P' of the mold for injection-molding the air conditioning case 110 is formed on the lower portion of the air conditioning case 110, such that if the protrusions 111 are formed on the inner periphery of the coupling hole 120 of the air conditioning case 110, undesirably, undercut may occur on the protrusions 111.

SUMMARY OF THE INVENTION

Accordingly, the present invention has been made in view of the above-mentioned problems occurring in the prior art, and it is an object of the present invention to provide an air conditioner for a vehicle that is capable of easily and simply assembling a thermistor-holding device insertedly with a coupling hole formed at one side surface of a lower case of an air conditioning case, while inserting first and second protrusions formed through upper and lower molds around the coupling hole thereto, such that the total number of parts and the working period are all reduced to improve the productivity of the product and the repairing or exchanging work of the thermistor is carried out easily.

To accomplish the above object, according to the present invention, there is provided an air conditioner for a vehicle including: an air conditioning case formed partitionally of a plurality of pieces to be assembled, and having a coupling hole 20 formed at one side surface thereof and at least one protrusion 11a and 11b formed spaced apart from the edge periphery of the coupling hole by a predetermined distance; an assembling part insertedly assembled with the coupling hole and having an insertion hole formed in the center thereof for inserting a wire connected to a thermistor thereto, wherein the assembling part includes an outside coupler having at least one fastening slot circumferentially formed thereon in such a manner as to be rotated at a state of fittingly inserting the at least one protrusion into the at least fastening slot, a handle grip coupled to the rear side of the outside coupler, and an inside coupler coupled integrally to the front side of the outside coupler in such a manner as to be inserted into the coupling hole and having a locking portion formed along the front end periphery thereof for preventing the assembling part from being escaped from the coupling hole during the rotation at the state of being inserted into the coupling hole; and a support part coupled to the assembling part in such a manner as to be placed near an evaporator for supporting the wire connected to the thermistor.

Further, the at least one protrusion is protruded outwardly from the air conditioning case.

The at least one fastening slots is of an arc shape and has at least one or more elastic pieces formed on the inner peripheries of the end portions thereof in the rotating direction thereof in such a manner as to be locked to the at least one protrusion, thereby fixing the position of the assembling part to the air conditioning case.

The inside coupler includes an insertion portion adapted to be inserted into the inner periphery of the coupling hole and the locking portion formed protrudingly along the front end periphery of the insertion portion in such a manner as to be locked to the inside of the air conditioning case during the rotation at the state of being inserted into the coupling hole.

The coupling hole has an extension portion formed along the inner periphery thereof, the extension portion having a shape corresponding to the locking portion of the inside coupler.

The support part further includes at least one or more clamps disposed at predetermined intervals therealong for supporting the outer periphery of the wire mounted at the top surface thereof, each of the clamps having a body having an opening adapted to fittably insert the support part thereinto and at least one spaced support projection protruded upwardly from the top end of the opening of the body for supporting the wire connected to the thermistor.

The air conditioning case is injection-molded through upper and lower molds separated in a direction orthogonal to the coupling hole.

The handle grip has a concaved groove formed thereon for guiding the wire.

The at least one protrusion is formed in such a manner as to cross each other.

So as to prevent the assembling part from being erroneously assembled with the coupling hole, one locking portion is formed along the front end periphery of the insertion portion of the inside coupler and one extension portion is formed along the inner periphery of the coupling hole in a corresponding shape to the locking portion.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 7a and 7b are front views showing an assembling part of the thermistor-holding device assembled with the coupling hole of the lower case in the air conditioner according to the present invention, wherein FIG. 7a shows the assembling part assembled with the coupling hole and FIG. 7b shows the assembling part being rotated after assembled with the coupling hole.

DETAILED DESCRIPTION OF THE PREFERRED EMBODIMENT

Hereinafter, an explanation of an air conditioner for a vehicle according to the present invention will be given with reference to the attached drawings.

Moreover, an explanation of the same construction and operation as the conventional practices will be avoided.

Figure 5:
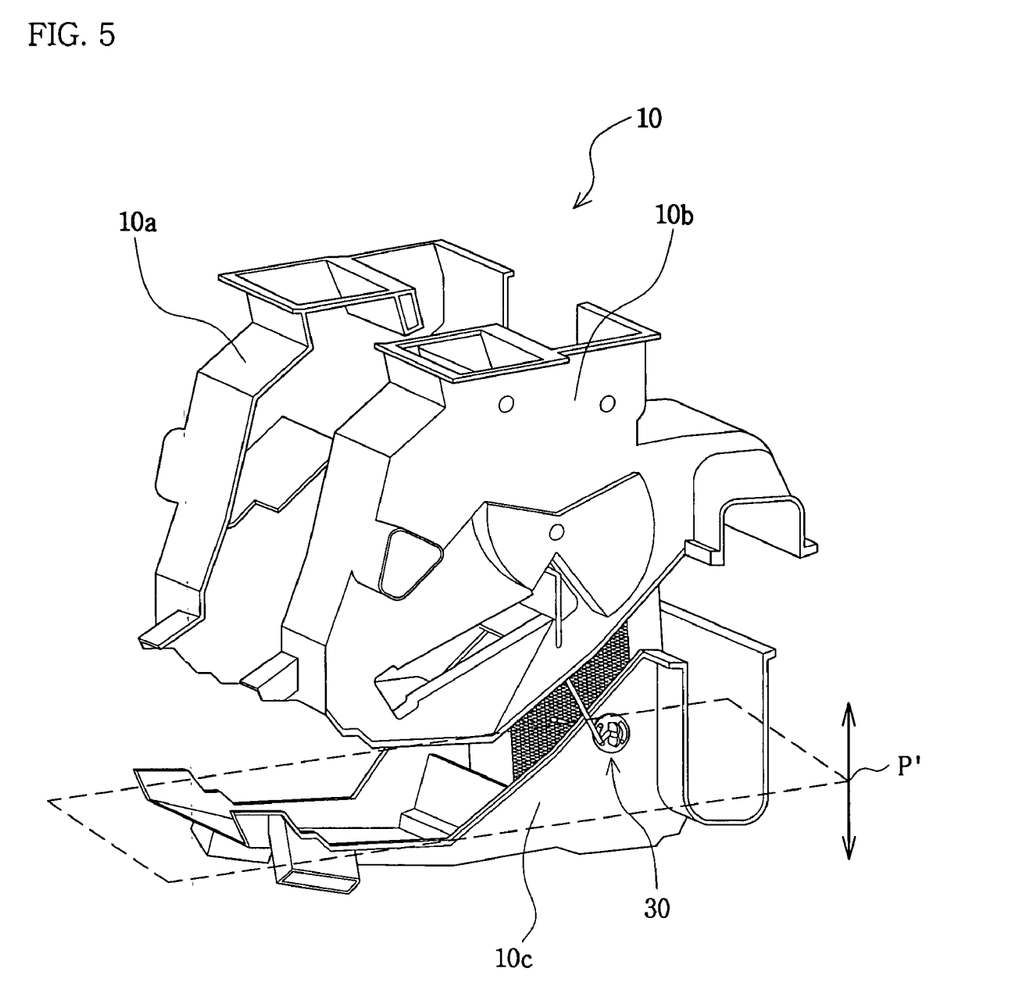
FIG. 5 is a perspective view showing a thermistor-holding device mounted at an air conditioning case divided into left, right, and lower cases according to an embodiment of the present invention.
Figure 6:
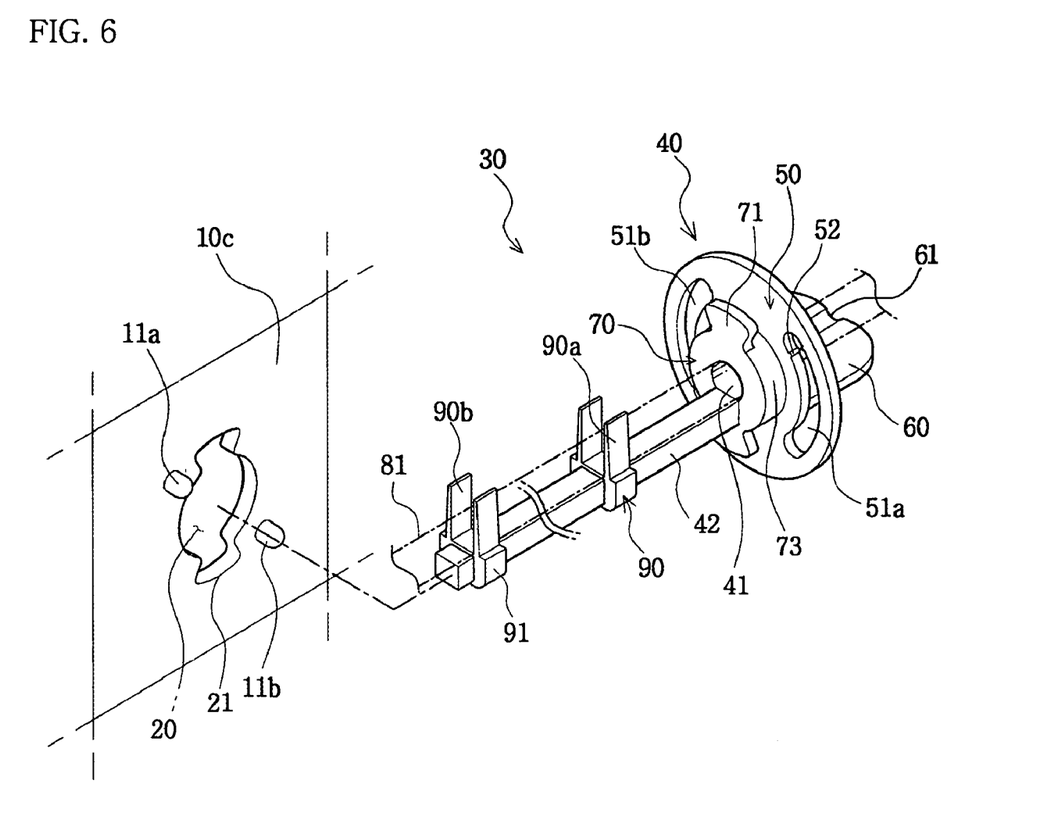
FIG. 6 is a perspective view showing a thermistor-holding device assembled with a coupling hole formed at one side surface of the lower case in the air conditioner according to the present invention.
Figure 7:
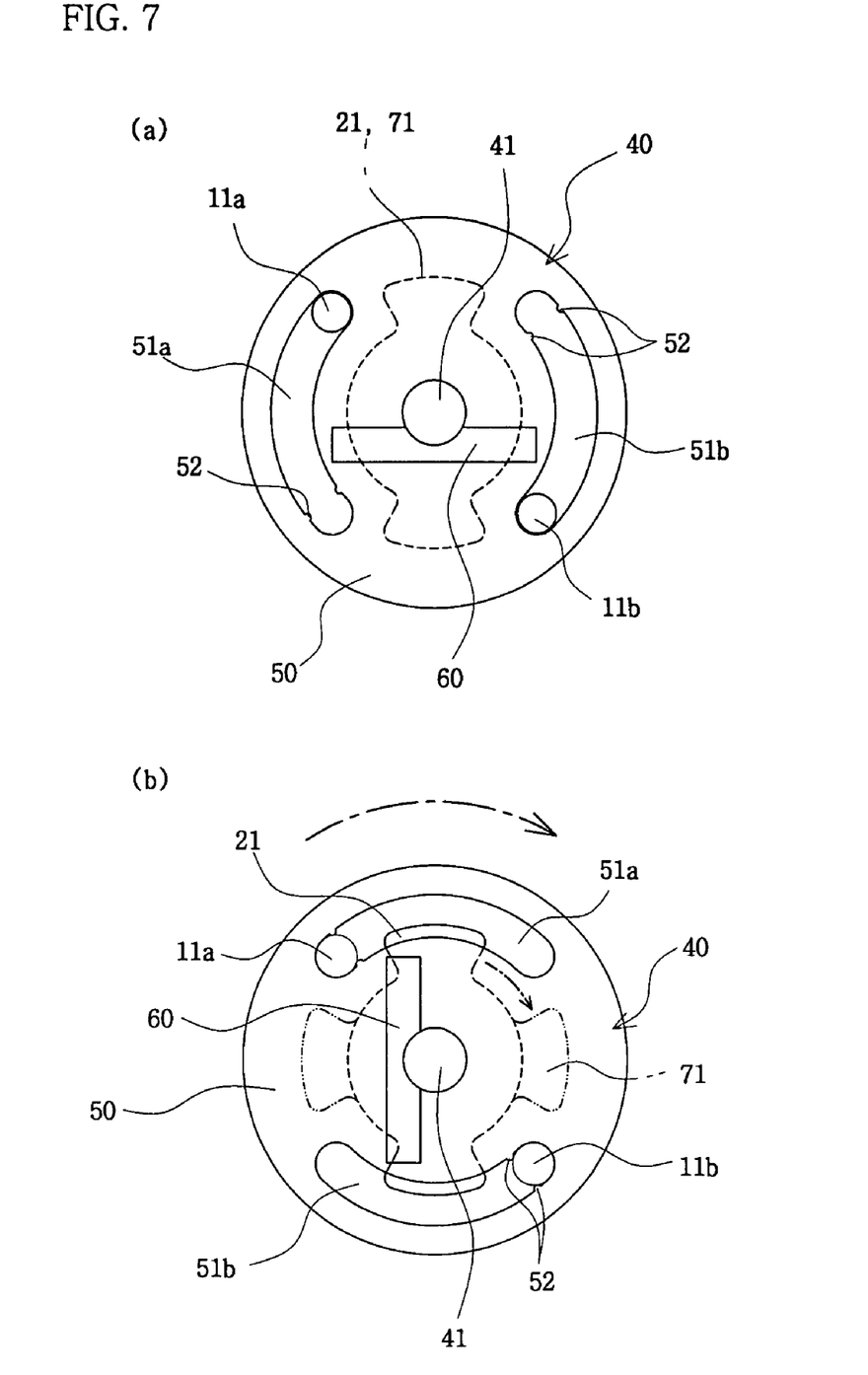
Figure 8:
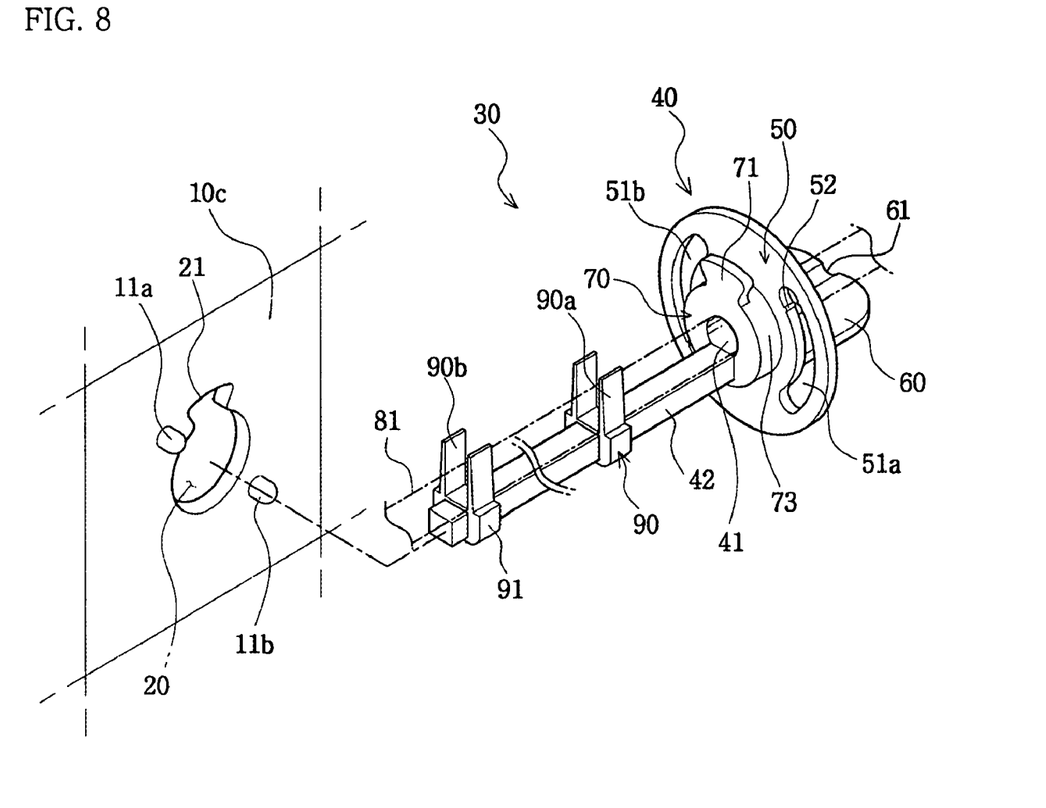
FIG. 8 is a perspective view showing a thermistor-holding device assembled with a coupling hole formed at one side surface of the lower case in the air conditioner according to another embodiment of the present invention.

FIG. 5 is a perspective view showing a thermistor-holding device mounted at an air conditioning case divided into left, right, and lower cases according to an embodiment of the present invention, FIG. 6 is a perspective view showing a thermistor-holding device assembled with a coupling hole formed at one side surface of the lower case in the air conditioner according to the present invention, FIGS. 7a and 7b are front views showing an assembling part of the thermistor-holding device assembled with the coupling hole of the lower case in the air conditioner according to the present invention, wherein FIG. 7a shows the assembling part assembled with the coupling hole and FIG. 7b shows the assembling part being rotated after assembled with the coupling hole, and FIG. 8 is a perspective view showing a thermistor-holding device assembled with a coupling hole formed at one side surface of the lower case in the air conditioner according to another embodiment of the present invention.

As shown in FIGS. 5 and 6, an air conditioner for a vehicle according to the present invention includes: an air conditioning case having an upper left case 10a, an upper right case 10b, and a lower case 10c, which are formed partitionally therein, the lower case 10c having a coupling hole 20 formed at one side surface thereof; an assembling part 40 insertedly assembled with the coupling hole 20 and having an insertion hole 41 formed in the center thereof for inserting a wire 81 connected to a thermistor 180 thereto; and a support part 42 coupled to the assembling part 40 in such a manner as to be placed near an evaporator, for supporting the wire 81 connected to the thermistor.

In this case, the lower case 10c of the air conditioning case 10 on which the coupling hole 20 is formed is desirably injection-molded by means of the upper and lower molds separated in a direction orthogonal to the coupling hole, so as to prevent the generation of undercut upon the injection-molding of first and second protrusions 11a and 11b as will be discussed below.

On the other hand, the present invention is applied to the air conditioning case 10 having the divided three parts, i.e., upper left case 10a, the upper right case 10b, and the lower case 10c and also may be applied to air conditioning case having a variety of shapes inclusive of the air conditioning case having left and right cases.

Further, in the air conditioner for a vehicle according to the present invention, the thermistor-holding structure is formed as shown in FIG. 6 wherein the coupling hole 20 is formed at one side surface of the lower case 10c and the first and second protrusions 11a and 11b are formed around the coupling hole 20 in such a manner as to be spaced apart from the edge periphery of the coupling hole 20 by a predetermined distance. The first and second protrusions 11a and 11b are desirably of a generally semispherical shape in such a manner as to be protruded outwardly from the lower case 10c.

In this case, the first and second protrusions 11a and 11b are formed in such a manner as to cross each other.

Moreover, a thermistor-holding device 30 is insertedly assembled with the coupling hole 20 of the lower case 20. The thermistor-holding device 30 includes the assembling part 40 adapted to be assembled to the coupling hole 20 and the linear support part 42 coupled integrally to one end of the assembling part 40 in such a manner as to be placed in a horizontal direction near an evaporator through the coupling hole 20, for supporting the wire 81 connected at the end to the thermistor.

The assembling part 40 largely includes an outside coupler 50, a handle grip 60, and an inside coupler 70. The outside coupler 50 has first and second fastening slots 51a and 51b formed on left and right sides thereof in such a manner as to be rotated by a predetermined angle at a state of receiving the first and second protrusions 11a and 11b formed around the coupling hole 20 of the lower case 10c thereinto.

The first and second fastening slots 51a and 51b are of an arc shape and each have a pair of elastic pieces 52 on the inner peripheries of the end portions thereof in the rotating direction thereof in such a manner as to be locked to the first and second protrusions 11a and 11b, thereby fixing the position of the assembling part 40 to the air conditioning case 10.

On the other hand, the first and second protrusions 11a and 11b and the first and second fastening slots 51a and 51b are desirably two in number as shown in the drawings, but single protrusion and fastening slot may be formed.

Also, since the first and second protrusions 11a and 11b are inserted into the first and second fastening slots 51a and 51b having the arc shape, they serve to define the rotation range of the assembling part 40 so as to rotate forwardly and backwardly within a predetermined angle (90°) and also serve to fix the rotation position of the assembling part 40 at the state of being supported by the elastic pieces 52 for preventing the fixed state of the assembling part 40 from being released.

Moreover, the first and second protrusions 11a and 11b also serve to guide the assembling part 40 when the assembling part 40 is assembled with the coupling hole 20.

Moreover, the handle grip 60 has a shape of a plate and is coupled integrally to the rear side of the outside coupler 50 in a perpendicular relation with the outside coupler 50. Moreover, the handle grip 60 has a concaved groove 61 for guiding the wire 81 thereon.

Also, the inside coupler 70 is coupled integrally to the front side of the outside coupler 50 in such a manner as to be inserted into the coupling hole 20 and has a locking portion 71 formed protrudingly along the front end periphery thereof for preventing the deviation thereof during the rotation at the state of being inserted into the coupling hole 20. In this case, the inside coupler 70 includes an insertion portion 73 adapted to be inserted into the inner periphery of the coupling hole 20 and the locking portion 71 formed protrudingly along the front end periphery of the insertion portion 73 in such a manner as to be locked to the inside of the lower case 10c during the rotation at the state of being inserted into the coupling hole 20. Also, the coupling hole 20 has an extension portion 21 formed on the upper and lower portions of the inner periphery thereof, the extension portion 21 having a shape corresponding to the locking portion 71 of the inside coupler 70.

The assembling part 40 integrally assembled with the outside coupler 50, the handle grip 60, and the inside coupler 70 has the insertion hole 41 formed in the center thereof for inserting the wire 81 connected to the thermistor 180 thereinto, such that the wire 81 is mounted along the top surface of the support part 42. At this time, the wire 81 is mounted along the top surface of the support part 42 connected to the inside coupler 70 in such a manner as to be passed through the inside of the coupling hole 20 of the lower case 10c.

Further, the support part 42 includes at least one or more clamps 90 disposed at predetermined intervals therealong for supporting the outer periphery of the wire 81 mounted along the top surface thereof. Each of the clamps 90 has a body 91 having an opening adapted to fittably insert the support part 42 thereinto and first and second spaced support projections 90a and 90b protruded upwardly from the top end of the opening of the body 91 for supporting the wire 81 connected to the thermistor 180.

FIG. 8 is a perspective view showing a thermistor-holding device assembled with a coupling hole formed at one side surface of the lower case in the air conditioner according to another embodiment of the present invention. In the above embodiment of the present invention as shown in FIGS. 5 to 7, the upper and lower locking portions 71 are formed along the front end periphery of the insertion portion 73 of the inside coupler 70, and the upper and lower extension portions 21 are formed correspondingly to the two locking portions 71 along the inner periphery of the coupling hole 20. However, in another embodiment of the present invention as shown in FIG. 8, one locking portion 71 is formed along the front end periphery of the insertion portion 73 of the inside coupler 70, and one extension portion 21 is formed to corresponding position and shape to the single locking portion 71 along the inner periphery of the coupling hole 20.

Therefore, this prevents the assembling part 40 from being erroneously assembled with the coupling hole 20.

On the other hand, according to still another embodiment of the present invention capable of preventing the assembling part 40 from being erroneously assembled with the coupling hole 20, a plurality of locking portions 71 is formed along the front end periphery of the insertion portion 73 of the inside coupler 70, and further, a plurality of extension portions 21 is formed to corresponding position and shape to the plurality of locking portions 71 along the inner periphery of the coupling hole 20. At this time, the plurality of locking portions 71 has different shapes and sizes from one another, thereby preventing the erroneous assembling.

Now, an explanation of the air conditioner for a vehicle according to the preferred embodiments of the present invention will be given with reference to FIGS. 6 and 7.

First, so as to insert the thermistor-holding device 30 into the coupling hole 20 of the lower case 10c, the handle grip 60 of the assembling part 40 is taken by a user's hand, and then, the thermistor-holding device 30 is inserted into the inside of the coupling hole 20 from the outside direction of the lower case 10c.

In this case, the inside coupler 70 of the assembling part 40 is inserted to a shape corresponding to the coupling hole 20. That is to say, the insertion portion 73 of the inside coupler 70 is inserted along the inner periphery of the coupling hole 20 in such a manner as to come into close contact with the coupling hole 20. Thus, the locking portions 71 that are protruded upwardly and downwardly in a symmetrical relation to each other along the front end periphery of the inside coupler 70 are inserted into the extension portions 21 of the coupling hole 20.

At this time, the first and second protrusions 11a and 11b formed around the coupling hole 20 are inserted into the first and second fastening slots 51a and 51b of the outside coupler 50 in such a manner as to be protruded outwardly.

At this state, if the handle grip 60 is rotated (in a direction of an arrow in the drawing), the first and second fastening slots 51a and 51b of the outside coupler 50 are rotated along the slot directions. At this time, the first and second fastening slots 51a and 51b stop at a position where the end portions of the rotation directions thereof are locked to the first and second protrusions 11a and 11b.

In this case, if the first and second protrusions 11a and 11b are placed at the end portions of the first and second fastening slots 51a and 51b that cross each other, the pair of elastic pieces 52 formed on each of the end portions of the first and second fastening slots 51a and 51b support the outer periphery of the first and second protrusions 11a and 11b for fixing the position of the assembling part 40, such that the assembling part 40 is not moved anymore.

At the same time, the inside coupler 70 inserted into the inside of the coupling hole 20 is rotated in the same direction as the first and second fastening slots 51a and 51b, and at this time, as the locking portions 71 protruded upwardly and downwardly along the front end periphery of the inside coupler 70 are rotated at the state of being inserted into the extension portions 21 of the coupling hole 20, they are locked to the inside of the lower case 10c, thereby preventing the assembling part 40 from being escaped from the coupling hole 20 of the lower case 10c.

Under the above-mentioned assembling structure, the thermistor-holding device 30 is completely assembled with the coupling hole 20, without any deviation from the coupling hole 20, which reduces the total number of assembling parts.

At the state where the thermistor-holding device 30 is assembled at one side surface of the lower case 10c, the wire 81 connected at the end thereof to the thermistor 180 is inserted into the insertion hole 41 formed in the center of the assembling part 40 in such a manner as to be mounted along the top surface of the support part 42, such that the wire 81 is disposed horizontally near the evaporator inside the lower case 10c. In this case, at least one or more clamps 90 of the support part 42 serve to support the outer periphery of the wire 81 mounted along the top surface of the support part 42.

If the thermistor 180 is out of order or defective, the wire 81 that is exposed to the handle grip 60 of the thermistor-holding device 30 is pulled, without any detachment of the thermistor-holding device 30, such that the thermistor 180 connected to the wire 81 is passed through the insertion hole 41 of the assembling part 40 along the support part 42 of the thermistor-holding device 30 and is finally taken out of the lower case 10c.

Thus, it is very convenient and easy to repair or exchange the thermistor 180.

As described above, there is provided an air conditioner for a vehicle according to the present invention that is capable of easily and simply assembling a thermistor-holding device insertedly with a coupling hole formed at one side surface of a lower case of an air conditioning case, while inserting first and second protrusions formed through upper and lower molds around the coupling hole thereto, such that the total number of parts and the working period are all reduced to improve the productivity of the product and the repairing or exchanging work of the thermistor is carried out easily.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An air conditioner for a vehicle comprising:

an air conditioning case formed partitionally of a plurality of pieces to be assembled, and having a coupling hole formed at one side surface thereof and at least one protrusion formed spaced apart from the edge periphery of the coupling hole by a predetermined distance;

an assembling part insertedly assembled with the coupling hole and having an insertion hole formed in the center thereof for inserting a wire connected to a thermistor thereto, wherein the assembling part includes an outside coupler having at least one fastening slot circumferentially formed thereon in such a manner as to be rotated at a state of fittingly inserting the at least one protrusion into the at least fastening slot, a handle grip coupled to the rear side of the outside coupler, and an inside coupler coupled integrally to the front side of the outside coupler in such a manner as to be inserted into the coupling hole and having a locking portion formed along the front end periphery thereof for preventing the assembling part from being escaped from the coupling hole during the rotation at the state of being inserted into the coupling hole; and a support part coupled to the assembling part in such a manner as to be placed near an evaporator for supporting the wire 81 connected to the thermistor.

2. The air conditioner for a vehicle according to claim 1, wherein the at least one protrusion is protruded outwardly from the air conditioning case.

3. The air conditioner for a vehicle according to claim 1, wherein the at least one fastening slots is of an arc shape and has at least one or more elastic pieces on the inner peripheries of the end portions thereof in the rotating direction thereof in such a manner as to be locked to the at least one protrusion, thereby fixing the position of the assembling part to the air conditioning case.

4. The air conditioner for a vehicle according to claim 1, wherein the inside coupler comprises an insertion portion adapted to be inserted into the inner periphery of the coupling hole and the locking portion formed along the front end periphery of the insertion portion in such a manner as to be locked to the inside of the air conditioning case during the rotation at the state of being inserted into the coupling hole.

5. The air conditioner for a vehicle according to claim 4, wherein the coupling hole has an extension portion formed along the inner periphery thereof, the extension portion having a shape corresponding to the locking portion of the inside coupler.

6. The air conditioner for a vehicle according to claim 1, wherein the support part further comprises at least one or more clamps disposed at predetermined intervals therealong for supporting the outer periphery of the wire mounted at the top surface thereof, each of the clamps having a body having an opening adapted to fittably insert the support part thereinto and at least one spaced support projections protruded upwardly from the top end of the opening of the body for supporting the wire connected to the thermistor.

7. The air conditioner for a vehicle according to claim 1, wherein the air conditioning case is injection-molded through upper and lower molds separated in a direction orthogonal to the coupling hole.

8. The air conditioner for a vehicle according to claim 1, wherein the handle grip has a concaved groove formed thereon for guiding the wire.

9. The air conditioner for a vehicle according to claim 1, wherein the at least one protrusion is formed in such a manner as to cross each other.

10. The air conditioner for a vehicle according to claim 5, wherein so as to prevent the assembling part from being erroneously assembled with the coupling hole, one locking portion is formed along the front end periphery of the insertion portion and one extension portion is formed along the inner periphery of the coupling hole in a corresponding shape to the locking portion.

11. The air conditioner for a vehicle according to claim 5, wherein so as to prevent the assembling part from being erroneously assembled with the coupling hole, a plurality of locking portions is formed along the front end periphery of the insertion portion, and a plurality of extension portions is formed along the inner periphery of the coupling hole in a corresponding shape to the plurality of locking portions, the plurality of locking portions having different shapes or sizes from one another.

* * * * *